(12) United States Patent
Bateman et al.

(10) Patent No.: US 6,391,983 B1
(45) Date of Patent: May 21, 2002

(54) CASTING COMPOSITION OF AROMATIC POLYVINYL MONOMER, POLYTHIOL AND EPOXY STRAIN REDUCER

(75) Inventors: Ian Roger Bateman, Happy Valley; Huan Kiak Toh, Fullarton; David Robert Diggins, Flagstaff Hill; Helena Kloubek, Morphett Vale, all of (AU)

(73) Assignee: Sola International Holdings, Ltd., Lonsdale (AU)

( * ) Notice: Subject to any disclaimer, the term of this patent is extended or adjusted under 35 U.S.C. 154(b) by 0 days.

(21) Appl. No.: 09/367,090

(22) PCT Filed: Jan. 19, 1998

(86) PCT No.: PCT/AU98/00021

§ 371 Date: Oct. 22, 1999

§ 102(e) Date: Oct. 22, 1999

(87) PCT Pub. No.: WO98/38146

PCT Pub. Date: Sep. 3, 1998

(30) Foreign Application Priority Data

Feb. 14, 1997 (AU) ............................................ PO 5102

(51) Int. Cl.[7] ............................. C08F 2/44; C08L 63/00; C08L 63/02
(52) U.S. Cl. ................... 525/529; 252/183.11; 525/531; 525/532; 526/214; 526/224
(58) Field of Search ............................... 525/529, 531, 525/532; 252/183.11; 526/214, 224

(56) References Cited

U.S. PATENT DOCUMENTS

| | | | |
|---|---|---|---|
| 4,049,745 A | * | 9/1977 | Schuster et al. ............. 525/523 |
| 5,288,844 A | | 2/1994 | Sakagami .................... 528/376 |
| 5,977,276 A | * | 11/1999 | Toh et al. ................... 526/323.2 |
| 6,153,663 A | * | 11/2000 | Chen et al. ................ 526/323.2 |

FOREIGN PATENT DOCUMENTS

| | | |
|---|---|---|
| AU | 50582/93 | 5/1994 |
| JP | 55-104318 A * | 8/1980 |
| JP | 6189733 | 5/1986 |
| JP | 6198732 | 5/1986 |
| JP | 6198734 | 5/1986 |
| JP | 62270627 | 11/1987 |
| JP | 62270631 | 11/1987 |
| JP | 62270634 | 11/1987 |
| JP | 6375033 | 4/1988 |
| JP | 6375034 | 4/1988 |
| JP | 6375035 | 4/1988 |
| JP | 63309506 | 12/1988 |
| JP | 63309508 | 12/1988 |
| JP | 63309509 | 12/1988 |
| JP | 02105821 | 4/1990 |
| JP | 02105822 | 4/1990 |
| JP | 02105824 | 4/1990 |
| JP | 01197527 | 8/1990 |
| JP | 01197528 | 8/1990 |
| JP | 01197529 | 8/1990 |
| JP | 02251531 | 10/1990 |
| JP | 02251532 | 10/1990 |
| JP | 02251533 | 10/1990 |
| JP | 02272028 | 11/1990 |
| JP | 02272029 | 11/1990 |
| JP | 02272030 | 11/1990 |
| JP | 02283729 | 11/1990 |
| JP | 02283730 | 11/1990 |
| JP | 02283731 | 11/1990 |

OTHER PUBLICATIONS

Chemical abstracts registry No. 3570–55–6 for bis(2–mercaptoethyl) sulfide, 1967.*
Chemical abstracts registry No. 170016–52–1 and 170016–25–8 showing 4,8–bis(mercaptomethyl)–3,6,9–trithia–1,11–undecanedithiol, 1967.*
Chemical abstracts registry No. 107–96–0 for 3–mecaptopropionic acid, 1967.*
Chemical abstracts registry No. 117344–32–8 for 9,9–bis [4–(2–hydroxyethoxy)phenyl]fluorene, 1967.*

* cited by examiner

Primary Examiner—Robert E. L. Sellers
(74) Attorney, Agent, or Firm—Burns, Doane, Swecker & Mathis, L.L.P.

(57) ABSTRACT

A crosslinkable polymeric casting composition comprises an aromatic polyvinyl monomer such as divinyl benzene, a polythiol such as pentaerythritol tetrakis-(3-mercaptopropionate), an epoxide strain-reducing agent such as hexanediol diglycidyl ether, and, optionally, a polymerizable comonomer such as polyethylene glycol dimethacrylate.

21 Claims, No Drawings

CASTING COMPOSITION OF AROMATIC POLYVINYL MONOMER, POLYTHIOL AND EPOXY STRAIN REDUCER

The present invention relates to the manufacture of plastic optical articles such as video discs and ophthalmic lenses.

The most widely used plastic ophthalmic lens material is polymerised diethylene glycol bis (allyl carbonate). This polymer has proved a satisfactory material for the manufacture of ophthalmic lenses because of a combination of features, including excellent transmission, resistance to discolouration, high strength and high impact resistance. The material has a reasonable abrasion resistance and can be coated to improve that resistance.

Lenses formed from polymers including divinyl benzene are generally brittle and have a high yellowness index.

In Australian Patent Application 81216/87, the entire disclosure of which is incorporated herein by reference, applicant describes a cross-linkable casting composition including at least polyoxyalkylene glycol diacrylate or dimethacrylate and at least one poly functional unsaturated cross-linking agent. Whilst the lenses produced from the prior art compositions provide advances in the art, difficulties may be encountered in certain applications. For example, difficulties may be encountered in some patients in fitting lenses made from such compositions. Eye discomfort, including eye fatigue problems, may be encountered. Moreover, such lenses have been found to be cosmetically unattractive.

Japanese Patent Application 63-309509 to Showa Denko KK discloses the formation of a prepolymer of divinyl benzene and a polythiol compound which may be used in the formation of optical materials with high refractive indexes.

Japanese Patent Application 63-19498 to Mitsubishi Gas discloses a high refractive index composition of divinyl benzene and a thiol compound. However optical lenses produced thereby may exhibit unacceptable strain characteristics and cure times.

However, there remains a need in the prior art for optical articles of very high refractive indexes, very low densities and excellent colour, that still retain excellent mechanical properties.

Accordingly, it is an object of the present invention to overcome, or at least alleviate, one or more of the difficulties related to the prior art.

Accordingly, the present invention provides a cross-linkable polymeric casting composition including an effective amount of an aromatic di- or poly-vinyl monomer;

a polythiol compound; and an epoxide strain reducing agent.

The inclusion of the strain reducing agent provides a reduction in strain evident in optical articles produced therefrom, together with a significant decrease in cure time, e.g. from approximately 24 hours to approximately 1 to 6 hours.

The aromatic di- or poly-vinyl monomer may be a di- or tri-olefin monomer. An aromatic divinyl monomer is preferred. The aromatic divinyl monomer may be selected from divinyl benzene, divinyl naphthene or derivatives thereof. Divinyl benzene is preferred. Other aromatic monomers may be included as discussed below.

The aromatic di- or poly-vinyl monomer may preferably be present in amounts of from approximately 35 to 85% by weight, more preferably approximately 40 to 60% by weight, based on the total weight of the casting composition.

The di- or polythiol compound may be of any suitable type. A di-, tri- or tetra polythiol compound may be used. A tri- or tetra-polythiol is preferred. The thiol may be selected from one or more of the following:

(a)
CH$_2$SH
|
CHSCH$_2$CH$_2$SH
|
CH$_2$SCH$_2$CH$_2$SH
4-mercaptomethyl-3,6-dithia-1,8-octanedithiol [MDO]

(b)
CH$_3$CH$_2$C(CH$_2$OCCH$_2$CH$_2$SH)$_3$
‖
O
Trimethylolpropane Tris (3-mercaptopropionate) [TTMP]

(c)
C(CH2OCCH$_2$SH)$_4$
‖
O
Pentaerythritol Tetrakis (3-mercaptoacetate) [PTMA]

(d)
CH$_3$CH$_2$C(CH$_2$OCCH$_2$SH)$_3$
‖
O
Trimethylolpropane Tris (3-mercaptoacetate) [TTMA]

(e)
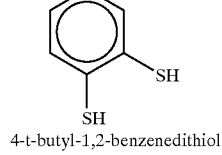
4-t-butyl-1,2-benzenedithiol (f)
HSCH$_2$CH$_2$SCH$_2$CH$_2$SH
Bis(2-mercaptoethyl)sulfide (g)
4,4'-thiodibenzenethiol (h)
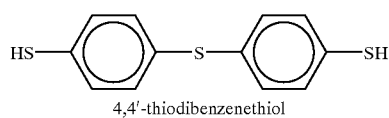
benzenedithiol

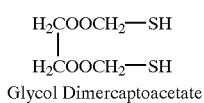
Glycol Dimercaptoacetate (i)

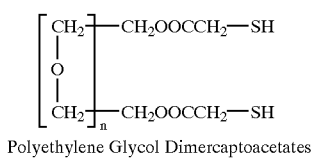
Polyethylene Glycol Dimercaptoacetates (k)

Pentaerythritol Tetrakis (3-mercapto-propionate) [PTMP] (m)

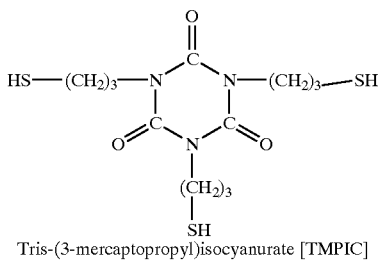
Tris-(3-mercaptopropyl)isocyanurate [TMPIC] (o)

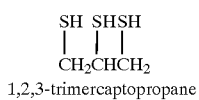
1,2,3-trimercaptopropane (q)

O[C(CH$_2$SH)$_3$]$_2$ (s)
Dipentaerythrithiol

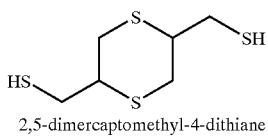
2,5-dimercaptomethyl-4-dithiane

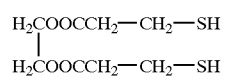
Glycol Dimercaptopropionate Ethylene bis(3-Mercaptopropionate) (j)

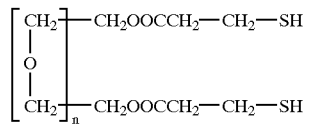
Polyethylene Glycol Di(3-Mercaptopropionate) (l)

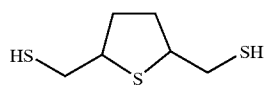
Mercapto-methyl tetrahydrothiophene [MMTHT] (n)

(HSCH$_2$CH$_2$)$_2$S (p)
—(p) bis(2-mercaptoethyl) sulphide

C(CH$_2$SH)$_4$ (r)
2,2-bis(mercaptomethyl)-1,3-propanedithiol

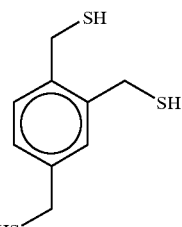
1,2,4-trimercaptomethyl benzene (t)

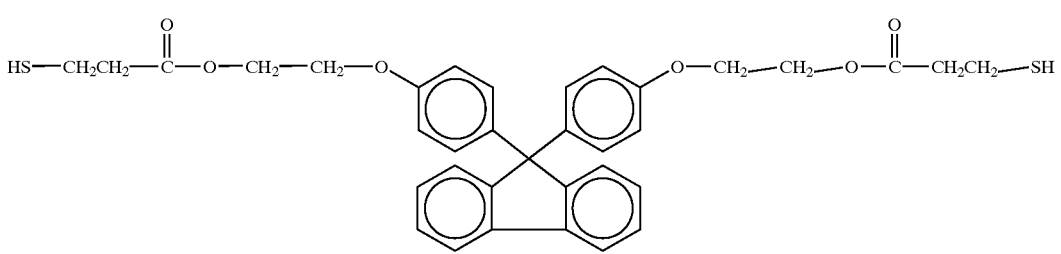
9,9-bis-[4-(2-hydroxyethoxyphenyl]fluorene di(3-mercaptopropionate)( BPHE-SH) (v)

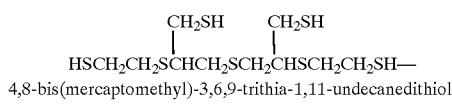 (w)

HSCH$_2$CH$_2$SCHCH$_2$SCH$_2$CHSCH$_2$CH$_2$SH—
4,8-bis(mercaptomethyl)-3,6,9-trithia-1,11-undecanedithiol HSCH$_2$CH$_2$OCH$_2$CH$_2$OCH$_2$CH$_2$SH
DMDO: 1,8-dimercapto-3,6-dioxaoctane H$_3$CC(CH$_2$SH)$_3$ (x)
2-mercaptomethyl-2-methyl-1,3-propanedithiol (y)

The polythiol is preferably pentaerythritol tetrakis (3-mercapto propionate) (PTMP) or trimethylolpropane tris (3-mercaptopropionate) (TTMP).

The thiol compound may preferably be present in amounts of from approximately 15 to 60% by weight, more preferably approximately 30 to 50% by weight, based on the total weight of the casting composition.

The strain reducing agent may be a cure modifier. The strain reducing agent may be an epoxidised monomer or oligomer. The strain reducing agent should exhibit optical transparency, in use. The epoxidised monomer or oligomer may fall into one or more of the following classes: internal, terminal, mono-functional, di-functional, tri-functional, tetra-functional, aliphatic, aromatic, cyclic, structurally simple, structurally complex, esters, ethers, amines. A diepoxy monomer or oligomer is preferred. An epoxidised soybean material may be used. The epoxidised monomer or oligomer may be selected from one or more of the following 1) Epoxidised soybean oil - Triglycerides of a mixture of a) oleic acid, b) linoleic acid, c) linolinic acid a)
CH$_3$(CH$_2$)$_6$CH$_2$CH—CHCH$_2$(CH$_2$)$_6$COOH
        \\O/ b)
CH$_3$(CH$_2$)$_3$CH$_2$CH—CHCH$_2$CH—CHCH$_2$(CH$_2$)$_6$COOH
        \\O/        \\O/ c)
CH$_2$CH$_2$CH—CHCH$_2$CH—CH—CH$_2$CH—CH(CH$_2$)$_7$COOH
      \\O/       \\O/       \\O/

2) Propylene Oxide (PO)

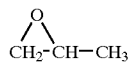

3) Bisphenol A diglycidyl ether (BADGE)

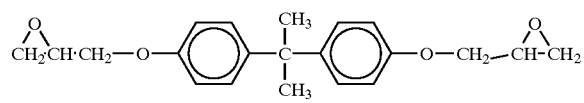

4) Hexanediol diglycidyl ether (HDGE)

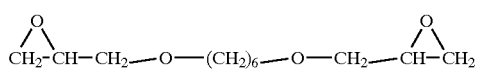

5) 1,2 epoxy butane

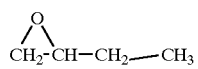

6) Bisphenol fluorene diglycidyl ether (BPGE)

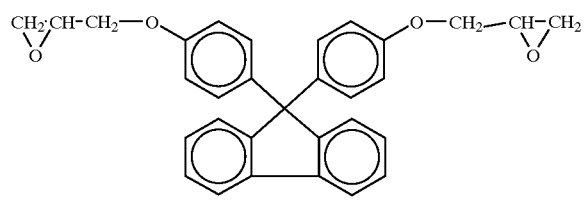

7) Epolight 100MF

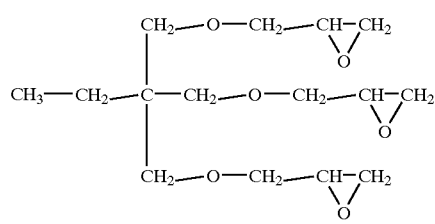

8) AK-601

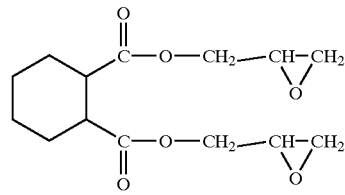

9) MY 721

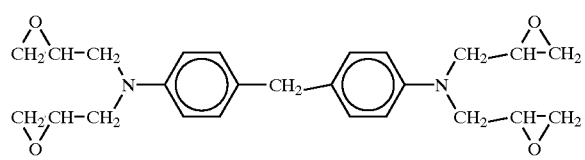

The strain reducing agent may be present in amounts of from approximately 0.001% to 10% by weight, preferably approximately 0.01% to 1%, more preferably approximately 0.5% to 0.4% by weight, based on the total weight of the casting composition. Where the strain reducing agent is an epoxy monomer, epoxy groups may be present in a concentration of at least approximately 0.001 moles, preferably 0.002 moles, per 100 grams of other monomers. The maximum concentration allowable in the formulation is dictated by the amount of dilution that is allowed. For a typical formulation including 48% divinyl benzene, 42% PTMP and 10% 9G, it is preferred that the concentration of epoxy groups be kept below 0.01 moles per 100 grams of monomer.

Whilst we do not wish to be restricted by theory, it is postulated that a number of competing reactions are involved in the polymerisation of the casting composition. The strain reducing agent may function as a polymerisation rate modifier. The strain reducing agent may function as a polymerisation inhibitor of unwanted sub-reactions.-

The crosslinkable polymeric casting composition according to the present invention may be utilised in the preparation of an optical article. The optical article may be characterised by being thinner and/or lighter than known prior art articles whilst retaining good abrasion resistance and impact resistance. The optical article may exhibit a high to very high refractive index, excellent colour and low density. Surprisingly, the polymeric article may also exhibit a very low Yellowness Index and may minimise or eliminate problems of strain exhibited in prior art formulations.

By the term "high refractive index", as used herein, we mean a polymer having a refractive index of at least approximately 1.55, preferably 1.57. By the term "very high refractive index" as used herein, we mean a polymer having a refractive index of approximately 1.59 or above, preferably 1.60 or above.

By "low density", as used herein, we mean a density in the range of approximately 1.15 to 1.25 g cm$^{-3}$.

The cross-linkable polymeric casting composition may optionally further include a polymerisable comonomer.

The polymerisable comonomer may be selected to improve the properties and/or processability of the cross-linkable polymeric casting composition. The polymerisable comonomer may be an unsaturated comonomer. The polymerisable comonomer may be selected from any suitable type, e.g. methacrylates, acrylates, vinyls, vinyl ethers, allyls, urethanes, unsaturated epoxides, and the like.

The polymerisable comonomer may preferably be selected from one or more of vinyls, allylics, polyoxyalkylene glycol di-, tri-, tetra- and higher acrylates or methacrylates, polymerisable bisphenol monomers capable of forming a homopolymer having a high refractive index of more than 1.55, urethane monomers having 2 to 6 terminal acrylic or methacrylic groups, high rigidity acrylates or methacrylates, fluorene diacrylates or dimethacrylates, and thiodiacrylate or dimethacrylate monomers.

Where a vinyl comonomer is included, the vinyl comonomer may be selected from styrene, substituted styrenes, 3,9-divinyl-2,4,8,10-tetraoxaspiro[5.5]undecane (DTU), and mixtures thereof. The vinyl comonomers may be present in amounts of from approximately 1 to 40% by weight, preferably approximately 5 to 30% by weight, based on the total weight of the casting composition.

Where a thiodiacrylate or dimethacrylate is included, the thiodiacrylate or dimethacrylates may be selected from bis(4-methacryloylthioethyl)sulfide (BMTES) and bis(4-methacryloylthiophenyl)sulfide (BMTS). The thiodiacrylate or dimethacrylate may be present in amounts of from approximately 1 to 40% by weight, preferably approximately 5 to 20% by weight, based on the total weight of the casting composition.

Where a fluorene diacrylate or methacrylate is included, the fluorene diacrylate or dimethacrylate monomer may be selected from a bisphenol fluorene dihydroxy acrylate (BFHA) or a bisphenol fluorene dimethacrylate (BFMA) or mixtures thereof.

The fluorene diacrylate or dimethacrylate monomer may be present in amounts of from approximately 1 to 35% by weight, preferably approximately 1 to 20% by weight.

The polyoxy alkylene glycol diacrylate or dimethacrylate compound according to the present invention, when present, may include ethylene oxide or propylene oxide repeating units in its backbone. A polyethylene glycol dimethacrylate is preferred. Suitable materials include dimethylacrylates where the number of repeating ethylene oxide groups is between 4 and 14. The polyethylene glycol sold under the trade designation 9G is preferred.

The polyoxy alkylene glycol diacrylate or dimethacrylate component may be present in amounts of from approximately 1% by weight to 40% by weight, preferably approximately 5% to 20% by weight, based on the total weight of the casting composition.

The high rigidity acrylates or methacrylates, when present, may be a high rigidity high Abbe number polyfunctional acrylate or methacrylate. Pentaerythritol tetracrylate (ATMDT) is a preferred example.

The high rigidity acrylates or methacrylates may be present in amounts of from 1% by weight to 40% by weight, preferably approximately 5% to 20% by weight, based on the total weight of the casting composition.

The high index bisphenol monomer component in the cross-linkable casting composition when present may be selected from: dimethacrylate and diacrylate esters of bisphenol A; dimethacrylate and diacrylate esters of 4,4'bishydroxy-ethoxy-bisphenol A and the like.

Preferred high index bisphenol compounds include bisphenol A ethoxylated dimethacrylate and tetra brominated bisphenol A ethoxylated dimethacrylates. A bisphenol A ethoxylated dimethacrylate sold under the trade designation ATM 20 by Ancomer has been found to be suitable.

The high index bisphenol monomer may be present in amounts of from approximately 1 to 40% by weight, preferably 5 to 25% by weight based on the total weight of the casting composition.

The urethane monomers, when present, may be a tetracyclic or higher urethane monomer.

Suitable materials falling within this definition include materials supplied under the trade names U-4H, U-4HA and U-6HA by Shin Nakamura, NF-201 and NF-202 by Mitsubishi Rayon. U-6HA is preferred. These monomers may be included to improve physical toughness without causing the lens material to become too brittle. Impact resistance is improved without adversely affecting abrasion resistance.

Certain urethane monomers, for example the aromatic urethane methacrylate NF202, are high refractive index components and may function alternatively or in addition as the or one of the secondary high index monomer component(s) of the casting composition.

The structures contained within any particular monomer can be selected from those containing aliphatic, aromatic, and cyclic structures of other forms. We have found that in the formulations of the present invention, the tetracrylic urethane monomer gives particularly satisfactory results.

The inclusion of the tetracrylic urethane monomer may provide a product of increased hardness.

The urethane monomer may be present in any suitable amount to provide a desired level of hardness. The urethane monomer may be present in amounts of from approximately 2.5 to approximately 25% by weight, preferably 5 to 10% by weight based on the total weight of the casting composition.

Where an epoxide monomer is included, the epoxide monomer may be selected from one or more of the group consisting of

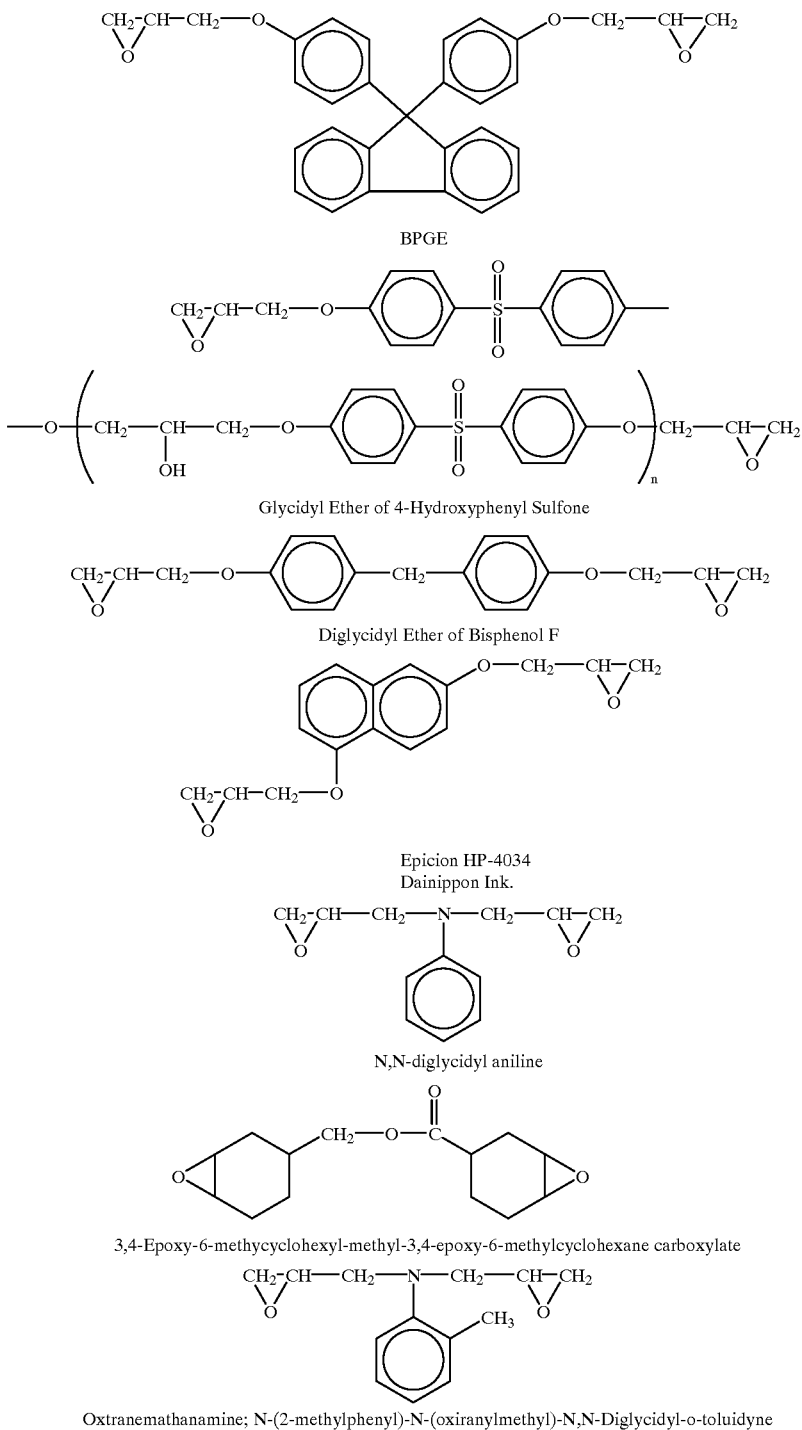

BPGE

Glycidyl Ether of 4-Hydroxyphenyl Sulfone

Diglycidyl Ether of Bisphenol F

Epicion HP-4034
Dainippon Ink.

N,N-diglycidyl aniline 3,4-Epoxy-6-methycyclohexyl-methyl-3,4-epoxy-6-methylcyclohexane carboxylate Oxtranemathanamine; N-(2-methylphenyl)-N-(oxiranylmethyl)-N,N-Diglycidyl-o-toluidyne The epoxide monomer is included, in addition to any one modifier, to improve the properties of the optical article including refractive index, coatability, impact strength and the like.

The epoxide monomer may be present in amounts of from approximately 1 to 40% by weight, preferably approximately 5 to 30% by weight, based on the total weight of the casting composition.

In a further aspect of the present invention the cross-linkable polymeric casting composition may further include at least one unsaturated cross-linking monomer having 3 or more polymerizable groups per molecule (polyfunctional).

The poly functional unsaturated cross-linking monomer according to the present invention may be a tri- or tetra-functional vinyl, an acrylic or methacrylic monomer. The cross-linking monomer may be a short chain monomer for example trimethylol propane trimethacrylate, pentaerythritol triacrylate or tetracrylate, or the like.

An ethoxylated trimethylol propane triacrylate has also been found to be suitable.

The poly functional unsaturated cross-linking monomer may be present in amounts of from 0 to approximately 40% by weight, preferably approximately 5 to 20% by weight based on the total weight of the casting composition.

The cross-linkable casting composition according to the present invention may include a polymerisation initiator. The polymerisation initiator may be a radical heat and/or ultraviolet (U.V.) cationic or radical initiator. A radical heat initiator is preferred. The compositions may be cured by a combination of UV radiation and/or heat. The combination of UV radiation and heat may reduce the possibility of incomplete curing for example due to the phenomenon known as "radical trapping".

The composition, with the addition of approximately 0.1% to 2.0% by weight of initiator may be exposed to UV radiation for between 0.5 and 60 seconds.

Any commercially viable UV curing system may be used. We have used a Fusion System with microwave driven lamps.

Typically 2–4 passes under the UV lamps plus an hour of heat treatment at 100° C. completes the cure.

Heat curing can also be used without any use of U.V. radiation. The length of heat cure may be between approximately 1 hour up to approximately 48 hours. Monomer filled moulds are placed in an oven. The oven is heated in accordance with a prescribed heating regime. Curing time may be between approximately 1 to 24 hours, preferably between about 1 and 6 hours. Heating profiles depend upon the type of monomers to be cured and the initiators used to cure them.

The amount of initiation may vary with the monomers selected. It has been possible to operate with a relatively low level of initiator of between approximately 0.05 and 1.5%, preferably 0.4% to 1.0% by weight.

The following initiators have been found to be suitable.

AIBN (Azo radical heat initiator) Azodiisobutyronitrile

TX-29 (Dialkyl Peroxide radical heat initiator) 1,1-di-(-butyl peroxy-3,3,5-trimethyl cyclohexane)

TBPEH (Alkyl Perester radical heat initiator) t-butyl per-2-ethylhexanoate (Diacyl Peroxide radical heat initiator) Benzoyl Peroxide (Peroxy Dicarbonate radical heat initiator) Ethyl Hexyl Percarbonate (Ketone Peroxide radical heat initiator) Methyl ethyl ketone peroxide Cyracure UV1-6974 (cationic photoinitiator) Triaryl sulfonium hexafluoroantimonate Lucirin TPO (radical photoinitiator) 2,4,6-Trimethylbenzoyldiphenylphosphine oxide Vicure 55 (radical photoinitiator) methyl phenylglycoxylate Bis(t-butyl peroxide) diisopropylbenzene t-butyl perbenzoate t-butyl peroxy neodecanoate Amicure DBU Amicure BDMA Initiator may be a single component or combination of initiator components.

Additionally, combination of photoiniator mixtures or photoinitiator mixtures with a heat induced free radical initiator such as peroxides, peroxypercarbonates or an azo compound may also be employed.

Preferably, as an alternative to photo curing a heat curing agent may be used, for example 1,1 di-tert butyl peroxy-3,3,5-trimethylcyclohexane (TX-29) or a t-butyl per-2-ethylhexanoate (TBPEH).

Other additives may be present which are conventionally used in casting compositions such as inhibitors, dyes, UV stabilisers and materials capable of modifying refractive index. Mould release agents can be added but they are in general not required with the compositions used in the method of the present invention. Such additives may include:

UV Absorbers Including

Ciba Geigy Tinuvin P—2(2'-hydroxy-5'methyl phenyl)-benzotriazole

Cyanamid Cyasorb UV 531-2-hydroxy4-n-octoxybenzophenone

Cyanamid Cyasorb UV5411-2(2-hydroxy-5-t-octylphenyl)-benzotriazole

Cyanamid UV 2098—2 hydroxy-4-(2-acryloyloxyethoxy) benzophenone

National Starch and Chemicals Permasorb MA -2 hydroxy-4-(2 hydroxy-3-methacryloxy) propoxy benzophenone Cyanamid UV24—2,2'dihydroxy-4-methoxybenzophenone BASF UVINUL 400—2,4 dihydroxy-benzophenone BASF UVINUL D49—2,2'-dihydroxy4,4'dimethoxy-benzophenone BASF UVINUL D-50—2,2',4,4'tetrahydroxy benzophenone BASF UVINUL D-35-ethyl-2-cyano-3,3-diphenyl acrylate BASF UNINYL N-539-2-ethexyl-2-cyano-3,3-diphenyl acrylate Ciba Geigy Tinuvin 213

Hindered Amine Light Stabilisers (HALS), Including

Ciba Geigy Tinuvin 765/292—bis (1,2,2,6,6-pentamethyl-4-piperidyl)sebacate

Ciba Geigy 770—bis (2,2,6,6-tetramethyl4-piperidinyl) sebacate

Antioxidants Including

Ciba Geigy Irganox 245—triethylene glycol-bis-3-(3-tertbutyl-4-hydroxy-5-methyl phenyl)propionate Irganox 1010-2,2-bis[[3-[3,4-bis(1,1-dimethytethyl)-4-hydroxyphenyl]-1-oxopropoxy]methyl]-1,3-propanediyl 3,5-bis(1,1-dimethyl ethyl)-4-hydroxy benzene propanoate Irganox 1076—octadecyl 3-(3',5'-di-tert-butyl(4'-hydroxyphenyl) propionate Anticolouring Agents Including Triphenyl phosphine 9,10 dihydro-9-oxa-10-phosphaphenanthrene-1-oxide Transfer Agents Including Dodecyl mercaptan Butyl mercaptan Thiophenol Nitroso compounds such as Q1301 from Wako Nofmer from Nippon Oils and Fats Other monomeric additives can be present in amounts up to 10% by weight as viscosity modifiers, and include monomers such as methacrylic acid, vinyl silanes, and other functional monomers. Other monomeric additives may be included to improve processing and/or material properties, these include:

methacrylic acid, maleic anhydride, acrylic acid adhesion promoters/modifiers such as Sartomer 9008, Sartomer 9013, Sartomer 9015 etc.

dye-enhancing, pH-adjusting monomers like Alcolac SIPOMER 2MIM a charge-reducing cationic monomer to render the material more antistatic, example Sipomer Q5–80 or Q9–75

In a further aspect of the present invention there is provided a polymeric article formed from a cross linkable casting composition as described above. The polymeric article may be an optical article. The optical article may provide characteristics equal to or greater than those achievable with articles made from diethylene glycol bis(allyl carbonate) but with a considerably reduced cure time and substantially increased throughput. The optical article may be further characterised by having reduced weight and/or thickness relative to the prior art, very low Yellowness Index and low density, whilst retaining good abrasion resistance and impact resistance.

The overall refractive index may be in the high to very high refractive index range of approximately 1.55 to 1.70, preferably above 1.59.

The optical articles prepared by the method of this invention include camera lenses, ophthalmic lenses and video discs.

In a still further aspect of the present invention there is provided a method for preparing a polymeric article, which methods includes providing
  a cross-linkable polymeric casting composition including an
  effective amount of
    an aromatic di- or poly-vinyl monomer;
    a di- or polythio compound; and
    a strain reducing agent; and
  a heat curing agent;
mixing the polymeric casting composition and curing agent; and subjecting the mixture to a heat curing step.

Preferably the polymeric article is an optical article.

The casting composition may be formed into a suitable article by mixing in a convenient vessel the components making up the material, and then adding the curing catalyst. The mixed material is then degassed or filtered. As the curing time is substantially reduced the casting process may be undertaken on a continuous or semi-continuous basis.

The present invention will now be more fully described with reference to the accompanying examples. It should be understood, however, that the description following is illustrative only and should not be taken in any way as a restriction on the generality of the invention described above.

EXAMPLE 1

A cross-linkable casting composition having the following components was prepared

|  | Percent by Weight |
|---|---|
| DVB (divinyl benzene) | 48% |
| 9G (polyethylene glycol dimethacrylate) | 10% |
| PTMP (Pentaerythritol Tetrakis (3-mercapto-propionate)) | 42% |
| Strain reducing agent Hexanediol diglycidyl ether (HDGE) | 0.17% |

The monomer mix was prepared in a beaker together with 0.5% TX29 (radical heat initiator). The strain reducing agent was then added and used to fill the space between a pair of glass moulds separated by a plastic gasket at their periphery and held together by a clip.

The mould was then placed in an oven and baked for 12 hours at 40° C. to 120° C.

EXAMPLES 2–17

Example 1 was repeated under simpler conditions with monomer mixes and initiators as designated in Table 1 below. Satisfactory lenses were produced in Examples 1 to 9 and 14 to 16. Examples 10 to 13 and 17 are comparative examples.

TABLE 1

| | Formulation | | | | Strain Reducing Agent | | Properties | | | | | | |
|---|---|---|---|---|---|---|---|---|---|---|---|---|---|
| Ex. | DVB (%) | PTMP (TTMP) (%) | 9G (ATM20) (Styrene) (%) | U6HA (%) | Initiator TX29 (%) | Type | Mole of epoxy per 100 g monomer (mephm) | RI | Density | Taber | Barcol | Vicat | Strain | Comments |
| 1 | 48 | 42 | 10 | 0 | 0.5 | HDGE | 0.002 | 1.591 | 1.22 | 12 | 27 | low | Good | HDGE no strain |
| 2 | 48 | 42 | 10 | 0 | 0.5 | PO | 0.002 | 1.591 | 1.22 | 12 | 27 | low | Good | PO, no strain |
| 3 | 48 | 42 | 10 | 0 | 0.5 | BADGE | 0.002 | 1.591 | 1.22 | 12 | 27 | low | Good | DER 332, no strain |
| 4 | 55 | 35 | 10 | 0 | 1 | HDGE | 0.002 | 1.591 | 1.18 | 11 | 33 | v.low | Good | HDGE, no strain |
| 5 | 55 | 35 | 10 | 0 | 1 | PO | 0.002 | 1.591 | 1.18 | 11 | 33 | v.low | Good | PO, no strain |
| 6 | 55 | 35 | 10 | 0 | 1 | BADGE | 0.002 | 1.591 | 1.18 | 11 | 33 | v.low | Good | DER 332, no strain |
| 7 | 51.5 | 47 | 2.5 | 0 | 0.5 | HDGE | 0.002 | 1.597 | 1.22 | 12 | 25 | v.low | Good | HDGE, no strain |
| 8 | 51.5 | 47 | 2.5 | 0 | 0.5 | PO | 0.002 | 1.597 | 1.22 | 12 | 25 | v.low | Good | PO, no strain |

TABLE 1-continued

| | Formulation | | | | | Strain Reducing Agent | | Properties | | | | | | |
|---|---|---|---|---|---|---|---|---|---|---|---|---|---|---|
| Ex. | DVB (%) | PTMP (TTMP) (%) | 9G (ATM20) (Styrene) (%) | U6HA (%) | Initiator TX29 (%) | Type | Mole of epoxy per 100 g monomer (mephm) | RI | Density | Taber | Barcol | Vicat | Strain | Comments |
| 9 | 51.5 | 47 | 2.5 | 0 | 0.5 | BADGE | 0.002 | 1.597 | 1.22 | 12 | 25 | v.low | Good | DER332, no strain |
| 10 | 55 | 35 | 10 | 0 | 1 | none | 0 | 1.591 | 1.18 | 11 | 33 | v.low | Bad | no cure modifier, bad strain |
| 11 | 50 | 40 | 5 | 5 | 1 | none | 0 | 1.59 | 1.2 | 10 | 34 | medium | Bad | no cure modifier, bad strain |
| 12 | 48 | 42 | 10 | 0 | 0.5 | none | 0 | 1.591 | 1.22 | 12 | 27 | low | Bad | no cure modifier, bad strain |
| 13 | 48 | 42 | 10 | 0 | 0.5 | HDGE | 0.0001 | 1.591 | 1.22 | 12 | 27 | low | Bad | HDGE at 0.0001%, strain |
| 14 | 48 | 42 | 10 | 0 | 0.5 | HDGE | 0.001 | 1.591 | 1.22 | 12 | 27 | low | Medium | HDGE at 0.001%, medium strain |
| 15 | 48 | 42 | 10 | 0 | 0.5 | HDGE | 0.005 | 1.591 | 1.22 | 12 | 25 | medium | Good | HDGE at 0.005%, no strain |
| 16 | 48 | 42 | 10 | 0 | 0.5 | HDGE | 0.01 | 1.591 | 1.22 | 12 | 23 | medium | Good | HDGE at 0.01% no strain but lens is softer |
| 17 | 48 | 42 | 10 | 0 | 0.5 | HDGE | 0.1 | <1.591 | 1.22 | 12 | 0 | v.high | Good | HDGE at 0.1%, no strain but lens is soft |
| 18 | 60 | 40 | 0 | 0 | 0.5 | hdge | 0.002 | 1.61 | 1.19 | 19 | 27 | low | Good | HDGE no strain |
| 19 | 70 | 30 | 0 | 0 | 0.5 | HDGE | 0.002 | 1.61 | 1.16 | 25 | 38 | low | Good | HDGE no strain |
| 20 | 70 | 30 (TTMP) | 0 | 0 | 0.5 | HDGE | 0.002 | 1.60 | 1.14 | 22 | 20 | low | Good | HDGE no strain |
| 21 | 50 | 30 | 20 | 0 | 0.5 | HDGE | 0.002 | 1.59 | 1.18 | 13 | 18 | low | Good | HDGE no strain |
| 22 | 50 | 30 | 20 (ATM20) | 0 | 0.5 | HDGE | 0.002 | 1.60 | 1.17 | 27 | 34 | low | Good | HDGE no strain |
| 23 | 50 | 30 | 20 (Styrene) | 0 | 0.5 | HDGE | 0.002 | 1.61 | 1.16 | 20 | 28 | low | Good | HDGE no strain |
| 24 | 66 | 34 | 20 (Styrene) | 0 | 0.5 | HDGE | 0.002 | 1.61 | 1.17 | 20 | 45 | low | Good | HDGE no strain |
| 25 | 66 | 34 (TTMP) | 0 | 0 | 0.5 | HDGE | 0.002 | 1.61 | 1.17 | 20 | 38 | low | Good | HDGE no strain |
| 26 | 60 | 30 | 10 | 0 | 0.5 | HDGE | 0.002 | 1.60 | 1.17 | 14 | 42 | low | Good | HDGE no strain |
| 27 | 50 | 40 | 10 | 0 | 0.5 | HDGE | 0.002 | 1.59 | 1.21 | 9 | 31 | low | Good | HDGE no strain |
| 28 | 40 | 50 | 10 | 0 | 0.5 | HDGE | 0.002 | 1.59 | 1.25 | 16 | 17 | low | Good | HDGE no strain |
| 29 | 50 | 40 | 5 | 5 | 0.5 | HDGE | 0.002 | 1.59 | 1.21 | 9 | 35 | low | Good | HDGE no strain |

Taber: 100 cycles CR-39 = 1-
Cure Modifier: moles of epoxy groups per 100 grams of monomer

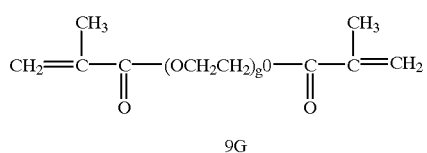

9G

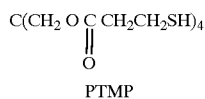

PTMP

Polyfunctional urethane acrylate supplied by Shin-Nakamura of Japan

U6HA

CH$_3$CH$_2$C(CH$_2$ O C CH$_2$CH$_2$SH)$_3$
         ∥
         O

TTMP

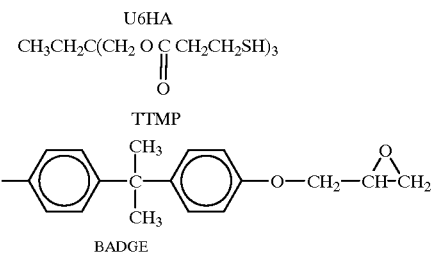

BADGE

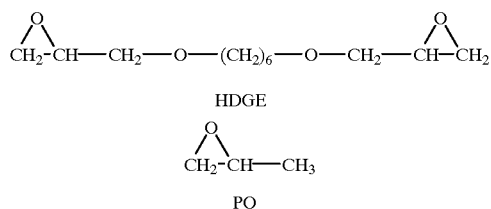

HDGE

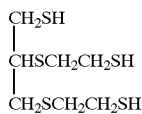

PO

DESCRIPTION OF TESTS

Taber

Apparatus used to assess the abrasion resistance of lens materials. It involves the use of an abrasive wheel rubbed across a lens surface. Degree of abrasion is assessed according to the level of haze induced by wear.

Vicat

Measure of the deflection of a lens material when subjected to a specified force at a fixed temperature.

Barcol

Measure of the hardness of a lens material. A fixed force is applied to a needle point. The depth of penetration indicates the degree of hardness.

Yellowness Index

A measure of the degree of yellowness as assessed by the Gardiner Colorimeter Model XL835.

Finally, it is to be understood that various other modifications and/or alterations may be made without departing from the spirit of the present invention as outlined herein.

What is claimed is:

1. A cross-linkable polymeric casting composition that comprises:
   an aromatic poly-vinyl monomer;
   a polythiol; and
   a strain reducing agent which is an epoxy compound.

2. A cross-linkable polymeric casting composition according to claim 1, wherein the aromatic poly-vinyl monomer is an aromatic divinyl monomer selected from the group consisting of divinyl benzene, divinyl naphthene and derviatives thereof.

3. A cross-linkable polymer casting composition according to claim 2, wherein the aromatic poly-vinyl monomer is present in amounts of from approximately 35% to 85% by weight, based on the total weight of the casting composition.

4. A cross-linkable polymeric casting composition according to claim 1, wherein the poly-thiol is at least one selected from the group consisting of:

(a) 4-mercaptomethyl-3,6-dithia-1,8-octanedithiol [MDO]

CH$_2$SH
|
CHSCH$_2$CH$_2$SH
|
CH$_2$SCH$_2$CH$_2$SH (b) Trimethylolpropane Tris (3-mercaptopropionate) [TTMP]

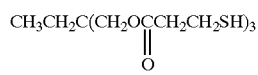

(h) benzenedithiol

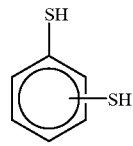

(i) Glycol Dimercaptoacetate

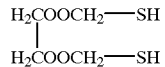

(j) Glycol Dimercaptopropionate Ethylene bis(3-Mercaptopropionate)

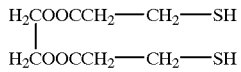

(k) Polyethylene Glycol Dimercaptoacetates

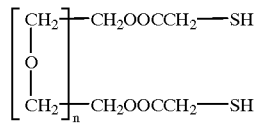

-continued (l) Polyethylene Glycol Di(3-Mercaptopropionate)

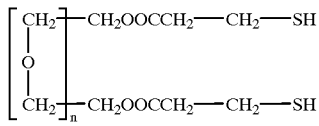

(m) Pentaerythritol Tetrakis (3-mercapto-propionate) [PTMP]

(n) Mercapto-methyl tetrahydrothiophene [MMTHT]

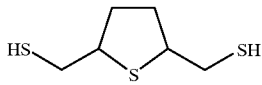

(o) Tris-(3-mercaptopropyl)isocyanurate [TMPIC]

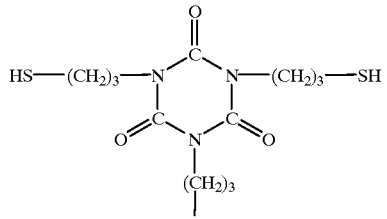

(p) bis(2-mercaptoethyl) sulphide $(HSCH_2CH_2)_2S$ (q) 1,2,3-trimercaptopropane

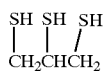

(r) 2,2-bis(mercaptomethyl)-1,3-propanedithiol $C(CH_2SH)_4$ (s) Dipentaerythrithiol $O[C(CH_2SH)_3]_2$ (t) 1,2,4-trimercaptomethyl benzene

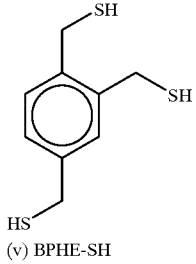

(u) 2,5-dimercaptomethyl-1,4-dithiane

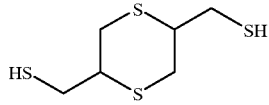

(v) BPHE-SH

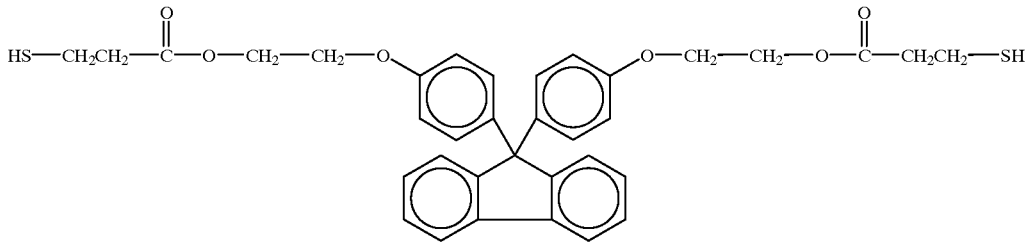

(w) 4,8-bis(mercaptomethyl)-3,6,9-trithia-1,11-undecanedithiol

HSCH$_2$CH$_2$SCHCH$_2$SCH$_2$CHSCH$_2$CH$_2$SH (x) 2-mercaptomethyl-2-methyl-1,3-propanedithiol $H_3CC(CH_2SH)_3$, and (y) DMDO: 1,8-dimercapto-3,6-dioxaoctane

HSCH$_2$CH$_2$OCH$_2$CH$_2$OCH$_2$CH$_2$SH.

5. A cross linkable polymeric casting composition according to claim 4 wherein the polythiol is selected from the group consisting of one or more of trimethylolpropane tris (3-mercaptopropionate) [TTMP], pentaerythritol tetrakis (3-mercaptoacetate) [PTMA], trimethylolpropane tris (3-mercaptoacetate) [TTMA], glycol dimercaptoacetate ethylene bis(3-mercaptopropionate), polyethylene glycol dimercaptopropionate polyethylene glycol di(3-mercaptopropionate), pentaerythritol tetrakis (3-mercapto-propionate) [PTMP], and 9,9-bis[4-(2-hydroxyethoxy)phenyl]fluorene di(3-mercaptopropionate) (BPHE-SH).

6. A cross-linkable polymeric casting composition according to claim 5, wherein the polythiol is pentaerythritol tetrakis (3-mercapto propionate) (PTMP) or trimethylolpropane tris (3-mercaptopropionate) (TTMP).

7. A cross-linkable polymeric casting composition according to claim 5, wherein the poly-thiol is present in amounts of from approximately 15% to 60% by weight, based on the total weight of the casting composition.

8. A cross-linkable polymeric casting composition according to claim 1, wherein the strain reducing agent is an epoxy compound selected from the group consisting of one or more of the following:

1) Epoxidised soybean oil-Triglycerides of a mixture of epoxidised a) oleic acid, b) linoleic acid, c) linolinic acid a)
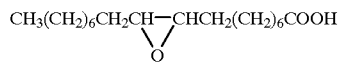

b)

c)
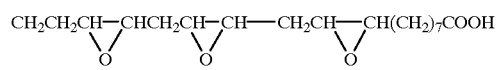

2) Propylene Oxide (PO)
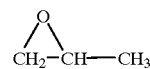

3) Bisphenol A diglycidyl ether (BADGE)
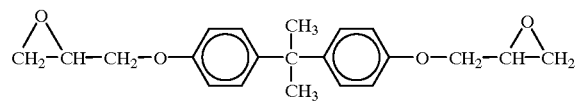

4) Hexanediol diglycidyl ether (HDGE)
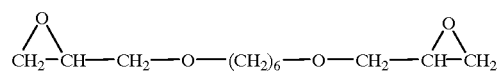

5) 1,2 epoxy butane
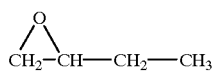

6) Bisphenol fluorene diglycidyl ether (BPGE)
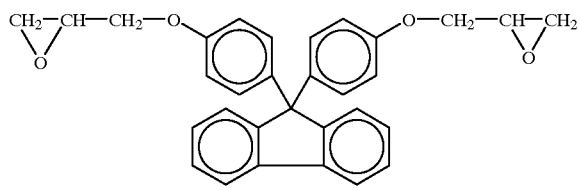

7)
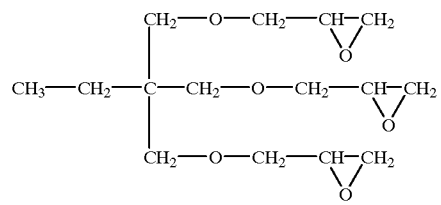

8)
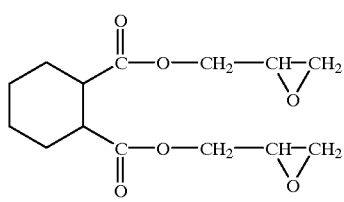
and

9)
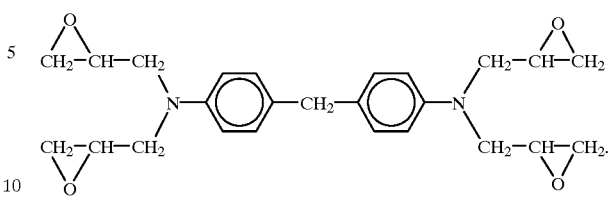

9. A cross-linkable polymeric casting composition according to claim 8, wherein the strain reducing agent is present in amounts of from approximately 0.001% to 10% by weight, based on the total weight of the casting composition.

10. A cross-linkable polymeric casting composition according to claim 9, wherein the strain reducing agent is present in amounts of from approximately 0.01% to 1% by weight.

11. A cross-linkable polymeric casting composition according to claim 1, further including a polymerisable comonomer selected from the group consisting of any one or more of methacrylates, acrylates, vinyls, vinyl ethers, allyls, urethane monomers having 2 to 6 terminal acrylic or methacrylic groups, and unsaturated epoxides.

12. A cross-linkable polymeric casting composition according to claim 11, wherein the polymerisable comonomer includes a polyoxyalkylene glycol diacrylate or dimethacrylate including between 4 and 14 repeating ethylene oxide groups in its backbone.

13. A cross-linkable polymeric casting composition according to claim 12, wherein the polyoxyalkylene glycol diacrylate or dimethacrylate is present in amounts of from approximately 1% to 40% by weight, based on the total weight of the casting composition.

14. A polymeric casting composition according to claim 11, wherein the polymerisable comonomer includes a urethane monomer selected from tetracyclic or higher urethane monomers.

15. A cross-linkable polymeric casting composition according to claim 14, wherein the urethane monomer is present in amounts of from approximately 2.5% to approximately 25% by weight, based on the total weight of the casting composition.

16. A cross-linkable polymeric casting composition according to claim 11, wherein the polymerisable comonomer is a high index bisphenol monomer selected from the group consisting of dimethacrylate and diacrylate esters of bisphenol A, dimethacrylate and diacrylate esters of 4,4'-bishydroxy-ethoxy-bisphenol A.

17. A cross-linkable polymer casting composition according to claim 16, wherein the high index bisphenol monomer is present in amounts of from approximately 1% to 40% by weight, based on the total weight of the casting composition.

18. A cross-linkable polymeric casting composition according to claim 11, wherein the polymerisable comonomer includes a vinyl comonomer selected from the group consisting of styrene, substituted styrenes, 3,9-divinyl-2,4,8,10-tetraoxaspiro[5.5]undecane (DTU), and mixtures thereof.

19. A cross-linkable polymeric casting composition according to claim 18, wherein the vinyl comonomer is present in amounts of from approximately 1 to 40% by weight, based on the total weight of the casting composition.

20. A cross-linkable polymeric casting composition according to claim 1, further including a heat curing agent selected from the group consisting of 1,1 di-tert butyl peroxy-3,3,5-trimethylcyclohexane and a t-butyl per-2-ethylhexanoate (TBPEH).

21. A cross-linkable polymeric casting composition according to claim 20, wherein the heat curing agent is present in amounts of from approximately 0.05% to 1.5% by weight, based on the total weight of the casting composition.

* * * * *